(12) United States Patent
Keohane et al.

(10) Patent No.: US 7,139,802 B2
(45) Date of Patent: Nov. 21, 2006

(54) ELECTRONIC MAIL DISTRIBUTION VIA A NETWORK OF COMPUTER CONTROLLED DISPLAY TERMINALS WITH INTERACTIVE DISPLAY INTERFACES ENABLING SENDERS TO SPECIFY INDIVIDUALS NOT TO RECEIVE THE E-MAIL DOCUMENTS BEING SENT

(76) Inventors: Susann Marie Keohane, 1911 Brackenridge St., Austin, TX (US) 78704; Gerald Francis McBrearty, 10709 Bayridge Cove, Austin, TX (US) 78759; Shawn Patrick Mullen, 39 Country Oaks, Buda, TX (US) 78610; Jessica Kelley Murillo, 980 County Rd. 109, Hutto, TX (US) 78634; Johnny Meng-Han Shieh, 5908 Upvalley Run, Austin, TX (US) 78731

( * ) Notice: Subject to any disclaimer, the term of this patent is extended or adjusted under 35 U.S.C. 154(b) by 665 days.

(21) Appl. No.: 10/195,190

(22) Filed: Jul. 11, 2002

(65) Prior Publication Data
US 2004/0010552 A1 Jan. 15, 2004

(51) Int. Cl.
*G06F 15/16* (2006.01)
(52) U.S. Cl. .................... 709/206; 709/203; 709/204; 709/250
(58) Field of Classification Search ............. 709/206, 709/205, 207, 250, 204, 203
See application file for complete search history.

(56) References Cited

U.S. PATENT DOCUMENTS

| | | | |
|---|---|---|---|
| 6,108,688 A * | 8/2000 | Nielsen | 709/206 |
| 6,628,306 B1 * | 9/2003 | Marchionda | 715/752 |
| 2002/0159575 A1 * | 10/2002 | Skladman et al. | 379/93.24 |
| 2002/0169782 A1 * | 11/2002 | Lehmann et al. | 707/100 |
| 2003/0014490 A1 * | 1/2003 | Bates et al. | 709/206 |
| 2003/0061289 A1 * | 3/2003 | Clissold et al. | 709/206 |

* cited by examiner

*Primary Examiner*—Zarni Maung
*Assistant Examiner*—Nghi Tran
(74) *Attorney, Agent, or Firm*—Jerry B Kraft; Mark E. McBurney (57) ABSTRACT

A display interface at a sending terminal including the conventional means enabling the sender of an electronic mail document to specify users to receive the document; but, in addition, provides means enabling the sender of the electronic mail document to specify users not receive the document. Then, users specified not to receive the electronic mail document are precluded from receiving the document. Thus, the sender is enabled to specify users not to receive a copy, forward or print of the document. A display interface is also provided at a receiving terminal that includes means enabling the receiver of an electronic mail document to further specify users to be forwarded the document; and also means enabling the receiver of the electronic mail document to specify users not to be forwarded the document. Thus, the means for precluding users specified not to receive the electronic mail document precludes those specified not to receive in the sender's E-Mail or specified not to receive by the recipient of a forwarded E-Mail document.

12 Claims, 8 Drawing Sheets

ELECTRONIC MAIL DISTRIBUTION VIA A NETWORK OF COMPUTER CONTROLLED DISPLAY TERMINALS WITH INTERACTIVE DISPLAY INTERFACES ENABLING SENDERS TO SPECIFY INDIVIDUALS NOT TO RECEIVE THE E-MAIL DOCUMENTS BEING SENT

TECHNICAL FIELD

The present invention relates to computer managed communication networks, such as the World Wide Web (Web), and particularly to electronic mail (E-Mail) messages transmitted over such networks to display terminals.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents. The Web of Internet, which had quietly existed for over a generation as a loose academic and government data distribution facility, reached "critical mass" and commenced a period of phenomenal expansion. With this expansion, businesses and consumers have direct access to all matter of documents and media through the Web. Also, as a result of the rapid expansion of the Web, E-Mail, which has been distributed for over 25 years over smaller private and specific purpose networks, has moved into distribution over the Web because of the vast distribution channels that are available.

The availability of extensive E-Mail distribution channels has made it possible to keep all necessary parties in business, government and public organizations completely informed of all transactions that they need to know about at almost nominal costs. However, there can be too much of a good thing. The availability of cheap E-Mail has led to an undesirable proliferation of E-Mail that many executive, management, professional and technical individuals are forced to handle. Our concern for this proliferation of E-Mail is not directed to conventional junk mail, i.e. E-Mail with subject matter in which the receiver has little or no interest. There are currently available a variety of application programs by which the user may filter out undesirable junk mail through the application of selected criteria appropriate to the user.

The E-Mail subject matter creating the proliferation problem to which the present invention is directed is often subject matter of great interest to the parties receiving copies or forwards of the E-Mail documents. However, it may be completely unnecessary and even totally inappropriate to send copies of the E-Mail on particular transactions to certain individuals. The need to limit E-Mail distribution would be obvious in adversarial relations, such as contract or litigation negotiations where there has been a history of E-Mail distribution to several parties on both sides. Under such circumstances, it may be critical for the originator or sender of the E-Mail document to prevent parties on the adverse side from receiving copies of proofs or new proposals that his side is still developing.

Of even greater significance is the problem of proliferation of E-Mail to higher level executives and managers in organizations on transactions that are being dealt with on lower levels and for which there is no need to know at the higher level. Such involvement of higher level management often interferes with the need in most effective lean present day business organizations to spread responsibility downward. In other circumstances, groups of individuals sharing responsibilities will divide the transactions among themselves and decide that they do not need to keep each other mutually informed. However, in both of these business management situations, recipients of E-Mail documents down the line, even in the same business organization, are unaware of divisions of responsibility between the personnel and forward copies to parties who do not need to know and do not want to know. It is the frequent lament of management people that they have to spend hours upon hours going through often unnecessary E-Mail.

Most current E-Mail applications do provide for a blanket "Do Not Copy" to completely preclude the copying of particularly sensitive E-Mail documents, but such an expedient is not a solution to the problems described above.

SUMMARY OF THE PRESENT INVENTION

The present invention provides an electronic mail distribution system for a network, e.g. Internet E-Mail transmitted between interactive display terminals. The invention offers a solution to the above problems by providing a display interface at a sending terminal including the conventional means enabling the sender of an electronic mail document to specify users to receive the document; but, in addition provides means enabling the sender of the electronic mail document to specify users not to receive the document. The invention then provides means for precluding users specified not to receive the electronic mail document from receiving the document. This invention is applicable to enable the sender to specify users not to receive a copy of, forward or print the document.

The invention further provides for a display interface at a receiving terminal that includes means enabling the receiver of an electronic mail document to further specify users to be forwarded the document, and also means enabling the receiver of the electronic mail document to specify users not to be forwarded the document. Thus, the means for precluding users specified not to receive the electronic mail document preclude both those specified not to receive in the sender's E-Mail, as well as those specified not to receive in the forwarded document.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is the display interface of FIG. 3 after the sender has selected to send the E-Mail and is prompted for individuals to copy to, not to copy to; to forward to, not to forward to; and to print to, not to print to;

DETAILED DESCRIPTION OF THE PREFERRED EMBODIMENT

Figure 1:
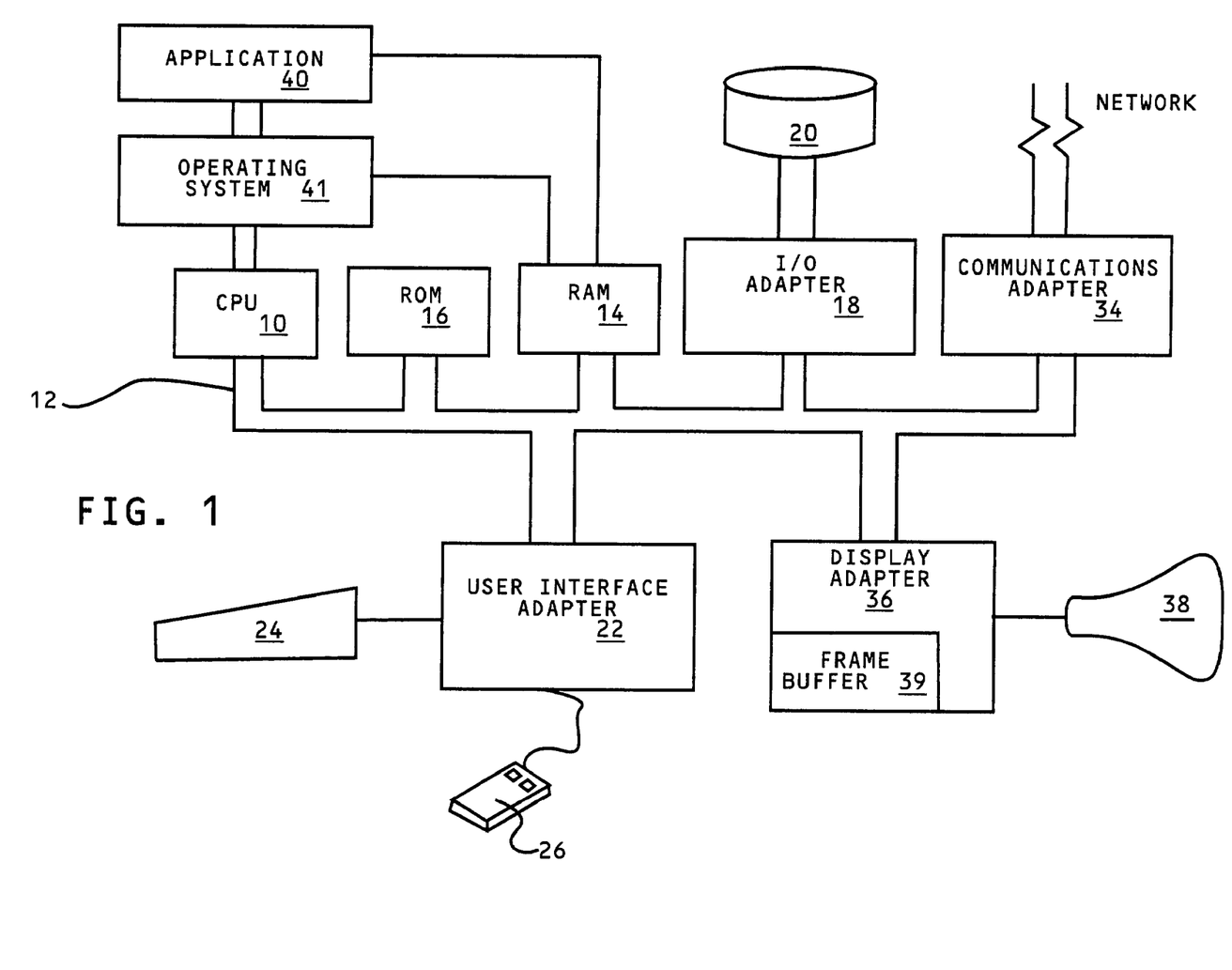
FIG. 1 is a block diagram of a data processing system including a central processing unit and network connections via a communications adapter that is capable of implementing the interactive display terminals, as well as servers in the Internet or Web E-Mail distribution of this invention.

Referring to FIG. 1, a typical data processing system is shown that may function as the computer controlled network terminals or Web stations used conventionally as any of the sending or receiving Web stations for electronic mail transmission. The system shown is also illustrative of any of the server computers used for the Web E-Mail distribution to be described in greater detail with respect to FIG. 2.

A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XP™ or Windows2000™, as well as UNIX and AIX operating systems. Application programs 40, controlled by the system, are moved into and out of the main memory Random Access Memory (RAM) 14. These programs include the programs of the present invention for enabling senders of E-Mail documents to specify individuals who are not to receive such documents. Where the computer system shown functions as the receiving Web station, then any conventional Web browser application program, such as the Microsoft's Internet Explorer™, will be available for accessing E-Mail from the Web and for sending E-Mail to the Web from the network station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to E-Mail documents transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. E-Mail is distributed through such a network.

Figure 2:
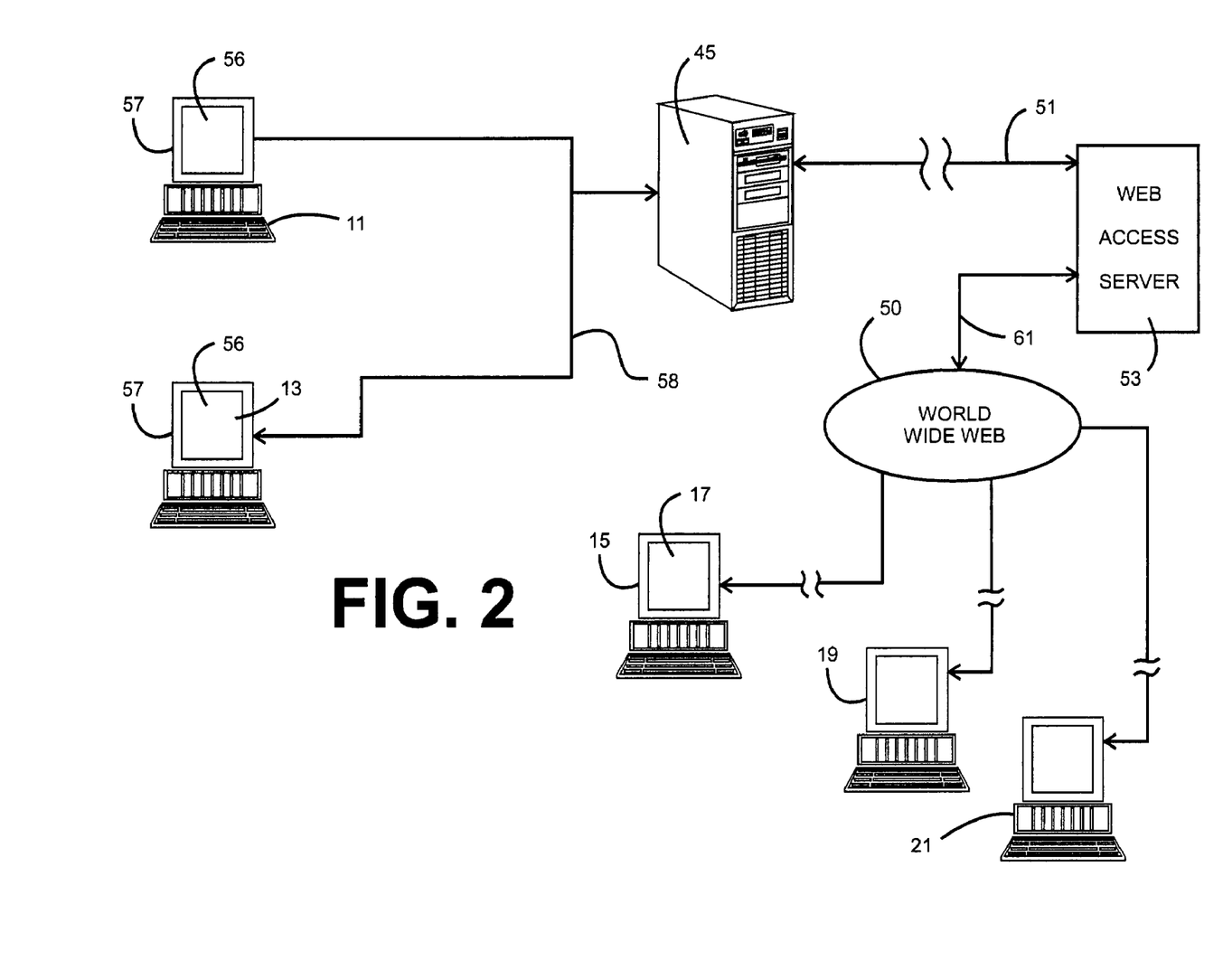
FIG. 2 is a generalized view of an E-Mail distribution system in a Web or Internet that may be used in the practice of the present invention.

A generalized diagram of a portion of the Web for illustration of the E-Mail distribution system of the present invention is shown in FIG. 2. The computer controlled display terminals 11 and 13 have displays 57 upon which E-Mail documents 56 may be created by senders and displayed. Terminals 11 and 15 may be implemented by the computer system setup in FIG. 1, and connection 58 (FIG. 2) is the network connection shown in FIG. 1. For purposes of the present embodiment, terminals 11 and 13 serve as a Web display station for sending of E-Mail via the display interfaces to be described with respect to FIGS. 3 through 6 via Web browser programs. Reference may be made to the above-mentioned *Mastering the Internet*, pp. 136–147, for typical connections between local display stations to the Web via network servers, any of which may be used to implement the system on which this invention is used. In the typical set up shown, terminals are connected via, let us say, host dial connections (not shown) to server 45 provided by a Web Service Provider that in turn accesses the Web 50 via connection 51 to a Web access server 53 and connection 61. For the purpose of this embodiment, E-Mail is created on either terminal 11 or 13, and sent over the Web 50 to receiving terminals 15, 19 or 21.

Figure 3:
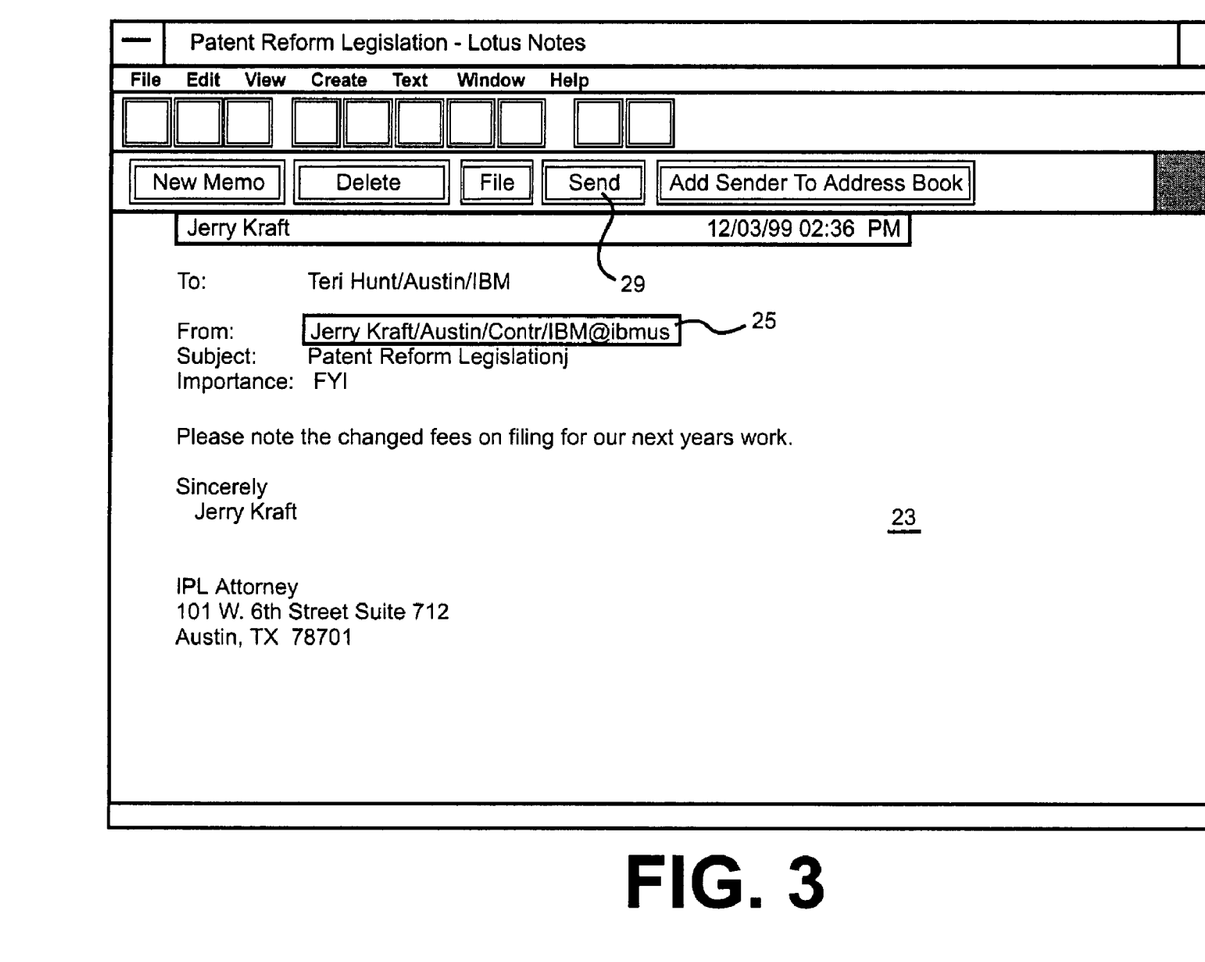
FIG. 3 is a diagrammatic illustration of an interactive display interface used for the writing of an E-Mail document.
Figure 4:
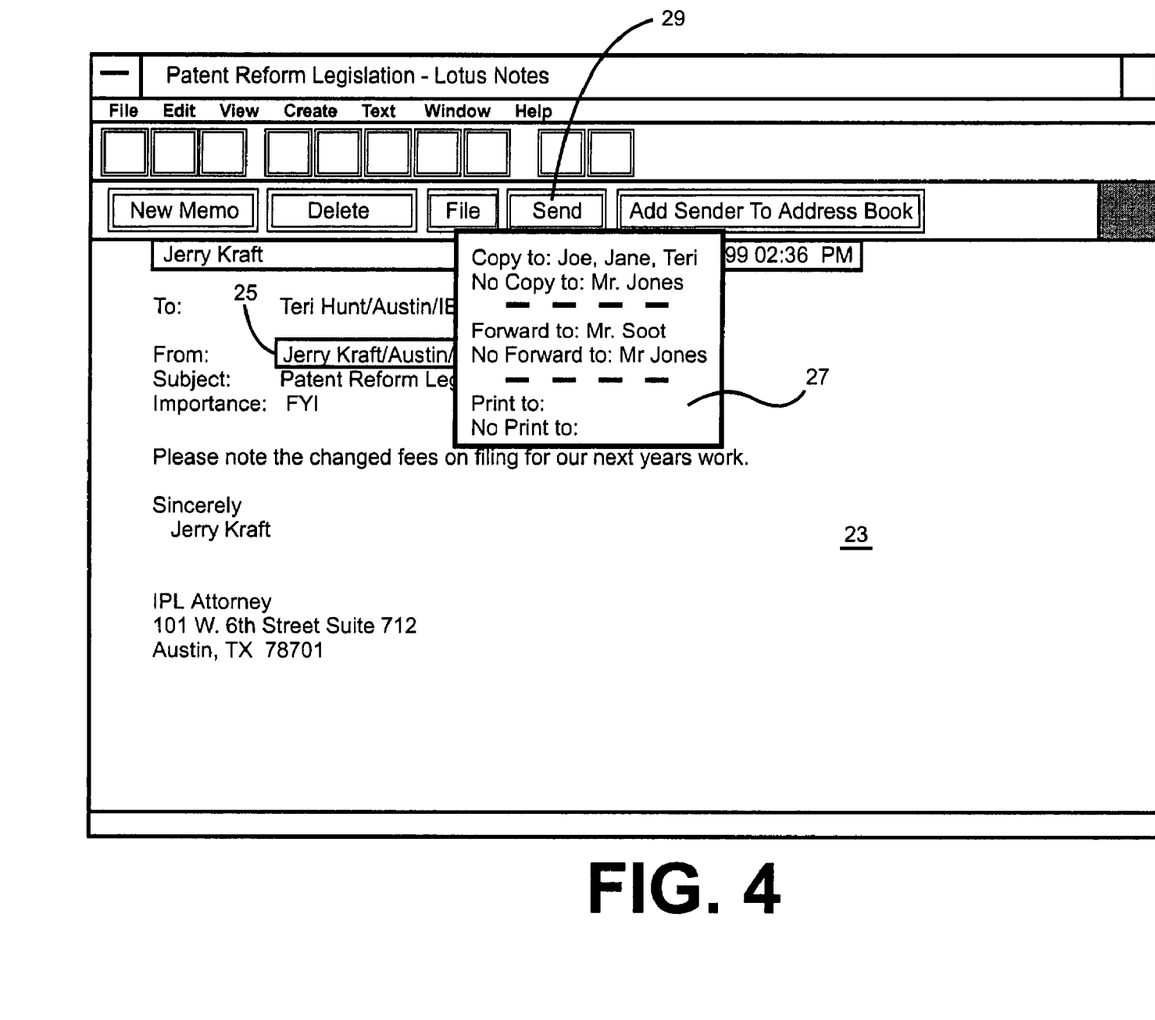

Within this E-Mail network set up, we will now consider the illustrative E-Mail distribution to be described with respect to FIGS. 3 through 6. In FIG. 3, there is illustrated an E-Mail document or letter 23 being created by a sender 25 as shown in FIG. 2, e.g. E-Mail 56 on sending terminals 11 or 13. When the user clicks once on "Send" button 29, FIG. 3, he is prompted with display box 27, FIG. 4, in which the sender is prompted to enter both "Copy To:", "Forward To:", "Print To:"; and "Not Copy To:", "Not Forward To:", "Not Print To:" names of individuals, i.e. those individuals to receive the E-Mail document and those specified individuals who are to be precluded form receiving the E-Mail document. The Send button 29 may then be clicked on again to send and distribute the E-Mail document.

Figure 5:
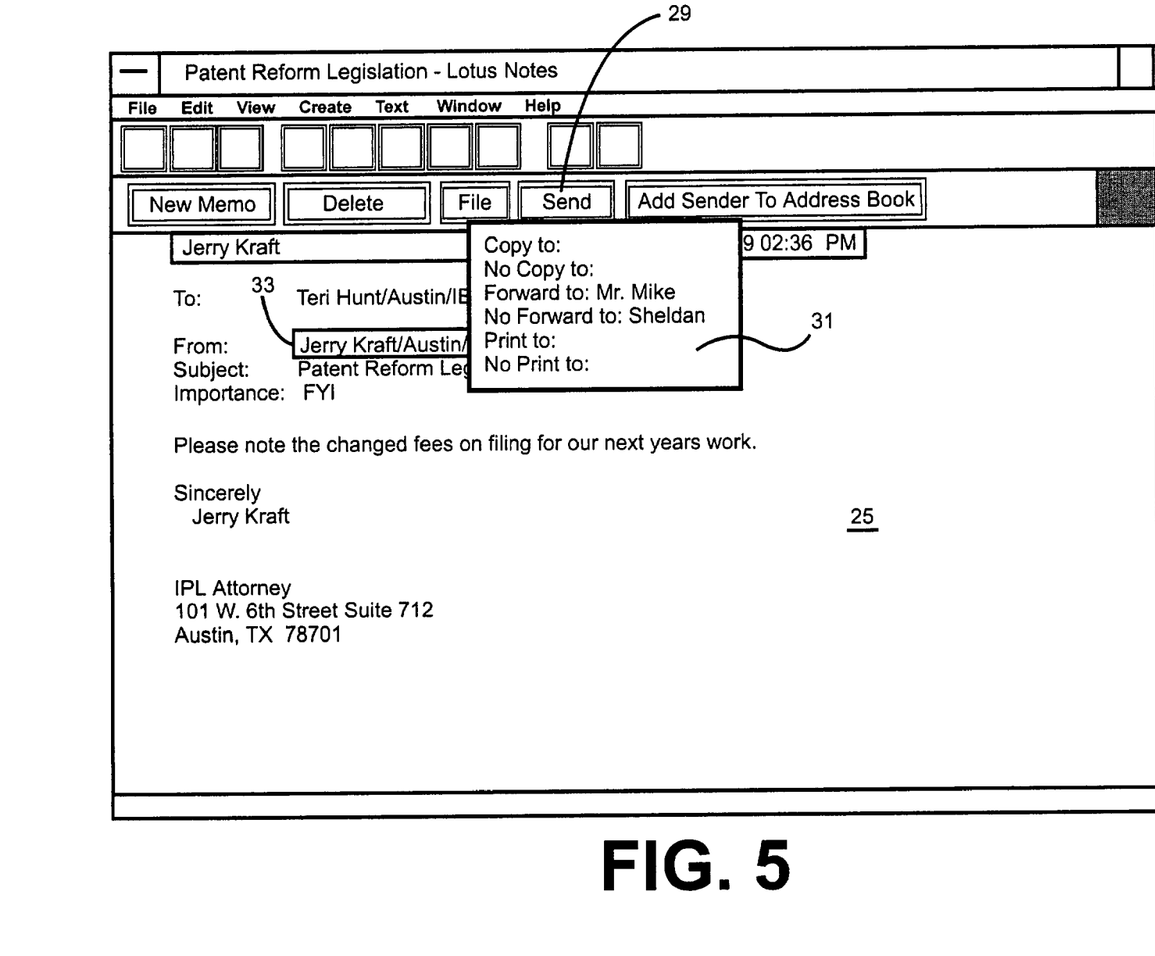
FIG. 5 is a display interface like that of FIG. 4 but presented to the recipients of an E-Mail that prompts for further forwarding, copying or printing of the E-Mail document.
Figure 6:
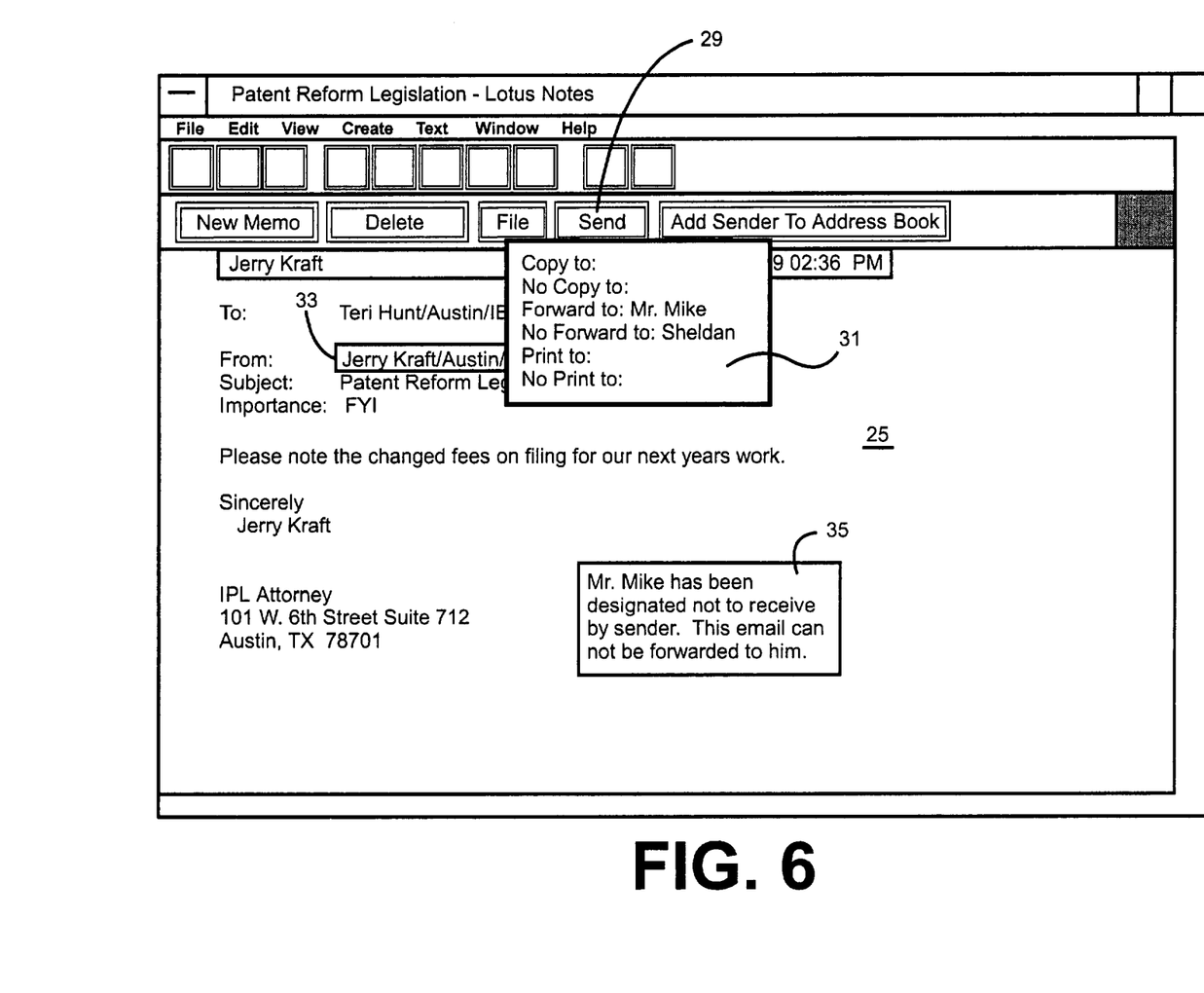
FIG. 6 is the display interface of FIG. 5 after the recipient has selected to forward the E-Mail and is advised that the sender has specified that the party selected for forward by the recipient has been designated "Not to Receive"

As will be described in some greater detail hereinafter, the "Not to Receive" or preclusion list of individuals attaches to and becomes part of the coding for the E-Mail document so that it is available to preclude downstream in the E-Mail document distribution cycle. Thus, as shown in FIG. 5, when the recipient 33 of the E-Mail document 25 sets up the send prompt box 31 to forward to a precluded individual, the forwarding will be prevented. For example, as shown in FIG. 6, the recipient of the E-Mail 25 has selected to forward to "Mr. Mike", who for the purpose of this illustration has been precluded by the original sender the recipient is advised in dialog box 35 that Mr. Mike has been designated "Not be Forwarded to". E-Mail 25 cannot be forwarded to Mr. Mike. Should the recipient still choose to inform Mr. Mike, the recipient would have to create an original E-Mail document conveying this information.

Figure 7:
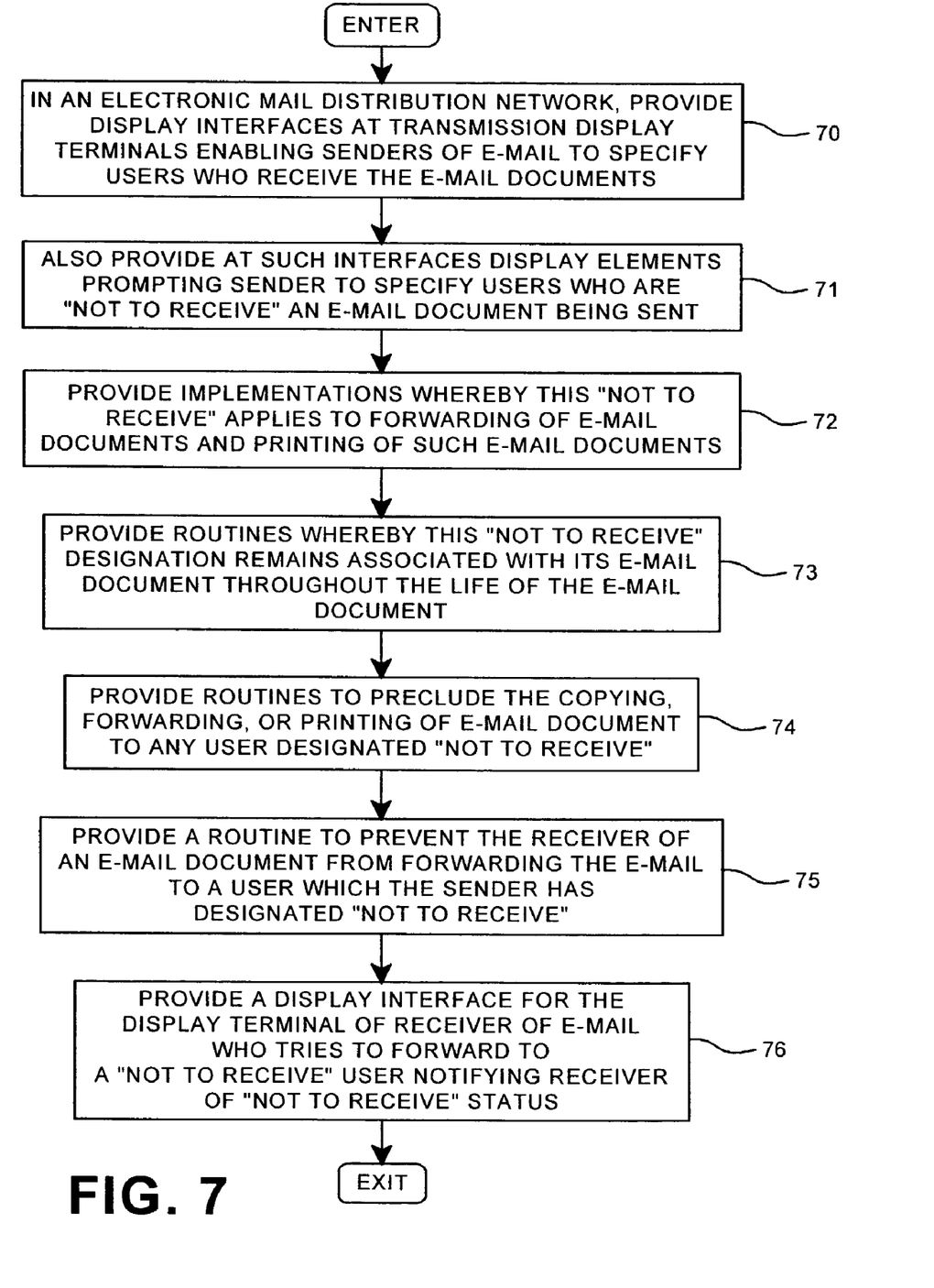
FIG. 7 is an illustrative flowchart describing the setting up of the functions to distribute E-Mail subject to the not to receive function of the present invention.

FIG. 7 is a flowchart showing the development of a process according to the present invention for enabling senders of electronic mail to prohibit the sending or forwarding of electronic mail to designated individuals. In any standard E-Mail network system, enabling senders at display terminals to distribute E-Mail to specified users, step 70, (reference may to made to such a distribution network as described in the text, *The ABCs of Lotus Notes* 4.5, R. Clayton, published by SYBEX Inc., San Francisco, 1997, particularly Chapter 18, pp. 367–398), there is also provided at the sender's display interfaces, dialog elements prompting the sender to enter the names of users who are not to receive the E-Mail document being sent, step 71. An implementation is provided wherein this "Not to send" function tracks the sender's document and precludes even the subsequent forwarding of the document to the prohibited recipients, step 72. This may readily be done by creating a list of such prohibited recipients and incorporating the list of addresses or equivalent appropriate identification of such prohibited recipients into the E-Mail document code. Accordingly, step 73, routines are provided such that the "Not to Receive" or equivalent designation remains associated with the sender's E-Mail document for the life of the document. Routines are provided to preclude the copying, forwarding or printing to any individual designated "Not to Receive", step 74. Such routines may simply involve a check of the prohibited user list that is incorporated into the document code. Since the prohibited list follows the E-Mail document, a checking routine will be set up at the recipients of E-Mail where the recipient will not be permitted to forward to a "Not to Receive" individual, step 75. In such a situation, a display interface will be provided at the recipient of the E-Mail who tries to forward the E-Mail and will notify the recipient of the "Not to Receive" status of the prohibited individual, step 76.

Figure 8:
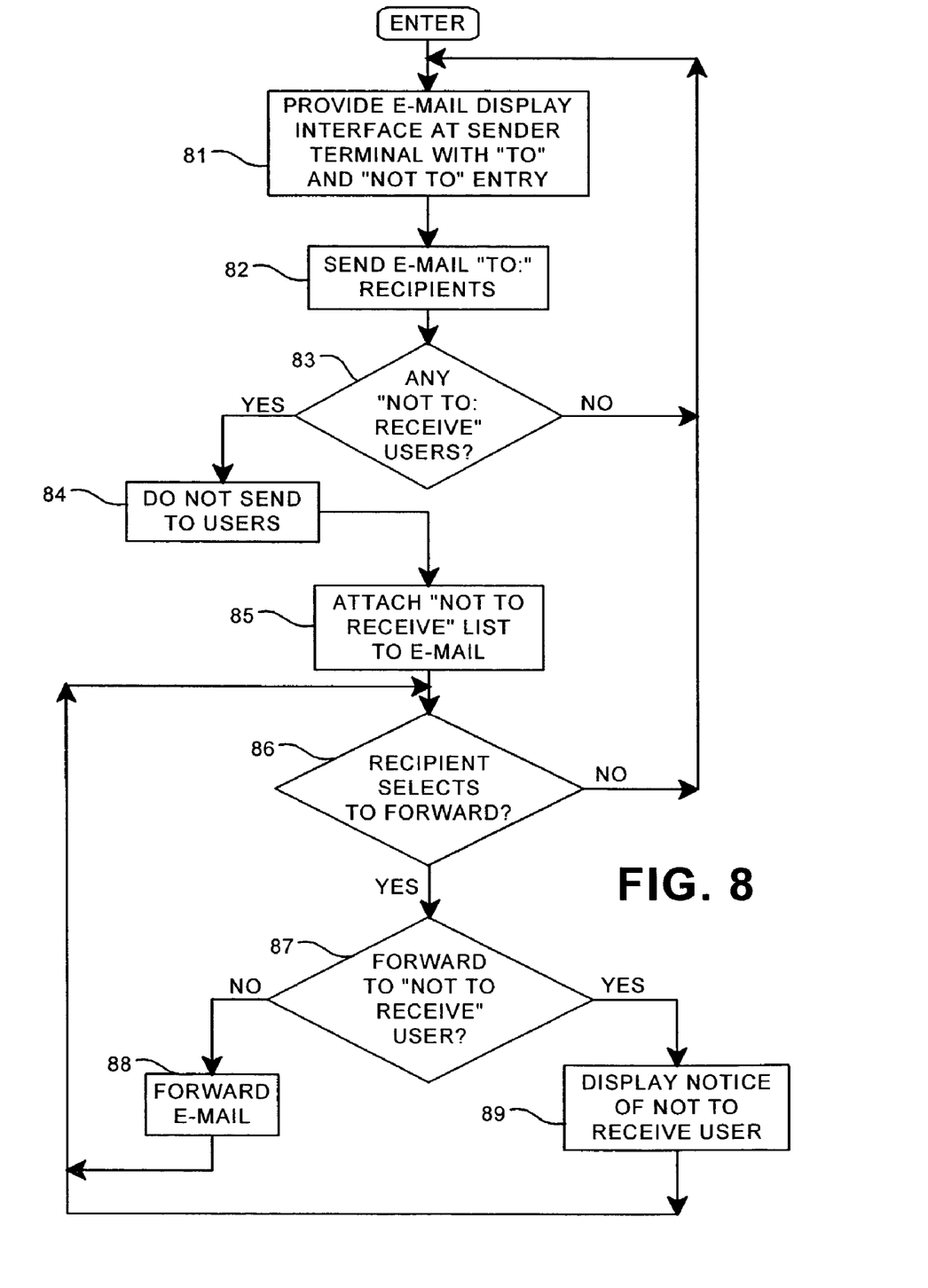
FIG. 8 is a flowchart of an illustrative run of the program set up according to FIG. 7.

A simplified run of the process set up in FIG. 7 and described in connection with FIGS. 3 through 6 will now be described with respect to the flowchart of FIG. 8. At the display, terminal of the E-Mail sender, there is provided an interface enabling the sender to indicate those individuals who are to receive and those not to receive, step 81; and the E-Mail documents are then sent to the designated recipients, step 82. Also, a determination is made as to whether there are any "Not to Receive" listings, step 83. If No, the process is returned to step 81 and the E-Mail processing is continued. If Yes, there are such listings, then the E-Mail documents are not sent to the designated individuals, step 84, the Not list is recorded into the E-Mail document code, step 85.

Now, as far as the recipients of E-Mail documents are concerned, there is an initial determination as to whether the recipient has selected to forward the document, step 86. If No, the process is returned to step 81 and the E-Mail processing is continued. If Yes, the recipient wishes to forward, a further determination is made as to whether the recipient has chosen to forward the E-Mail to someone who has been designated "Not to Receive", step 87. If Yes, an appropriate notice is displayed, FIG. 6, to the one who wishes to forward. If No, then the E-Mail document is forwarded in a conventional manner, step 88. In either case, the process is returned to step 81 and the E-Mail processing is continued.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory, such as an optical disk for use in a CD ROM computer input, or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communication network with user access via a plurality of data processor controlled interactive display terminals, an electronic mail distribution system for mail transmitted between said terminate comprising:
    a display interface at a sending terminal including:
        means enabling the sender of an electronic mail message, including a receiver of said electronic mail message forwarding the received message, to specify users to receive the message; and
        means enabling the sender, including said receiver of an electronic mail message forwarding the received message, of the electronic mail message to specify users not receive and not be forwarded the message; and
    means for precluding users specified not to receive and not be forwarded the electronic mail message from receiving the message.

2. The electronic mail distribution system of claim 1 wherein said means for specifying users not to receive enable the sender to specify users not to receive a copy of the message.

3. The electronic mail distribution system of claim 1 wherein said means for specifying users not to receive enable the sender to specify users not to receive a forwarded version of the message.

4. The electronic mail distribution system of claim 1 wherein said means for specifying users not to receive enable the sender to specify users not to receive a printed version of the message.

5. In an electronic mail distribution network with user access via a plurality of data processor controlled interactive display terminals, an electronic mail distribution method for mail transmitted between said terminals comprising:
    displaying an electronic message to be sent at a sending terminal;

enabling the sender of the electronic mail message, including a receiver of said electronic mail message forwarding the received message, to specify users to receive the message;

enabling the sender, including said receiver of an electronic mail message forwarding the received message, of the electronic mail message to specify users not to receive and not to be forwarded the message; and precluding users specified not to receive and not to be forwarded the electronic mail message from receiving the message.

6. The electronic mail distribution method of claim 5 wherein said step of specifying users not to receive enables the sender to specify users not to receive a copy of the message.

7. The electronic mail distribution method of claim 5 wherein said step of specifying users not to receive enables the sender to specify users not to receive a forwarded version of the message.

8. The electronic mail distribution method of claim 5 wherein said step of specifying users not to receive enables the sender to specify users not to receive a printed version of the message.

9. A computer program having a code recorded on a computer readable medium for distribution of electronic mail in an electronic mail distribution network with user access via a plurality of data processor controlled interactive display terminals, said computer program comprising:

a display interface at a sending terminal including:

means enabling the sender of an electronic mail message, including a receiver of said electronic mail message forwarding the received message, to specify users to receive the message; and means enabling the sender, including said receiver of an electronic mail message forwarding the received message, of the electronic mail message to specify users not receive and not be forwarded the message; and means for precluding users specified not to receive and not be forwarded the electronic mail message from receiving the message.

10. The computer program of claim 9 wherein said means for specifying users not to receive enable the sender to specify users not to receive a copy of the message.

11. The computer program of claim 9 wherein said means for specifying users not to receive enable the sender to specify users not to receive a forwarded version of the message.

12. The computer program of claim 9 wherein said means for specifying users not to receive enable the sender to specify users not to receive a printed version of the message.

* * * * *